M. STROM & E. HOGLUND.
SOIL CULTIVATOR.
APPLICATION FILED APR. 2, 1917.
1,238,953.
Patented Sept. 4, 1917.
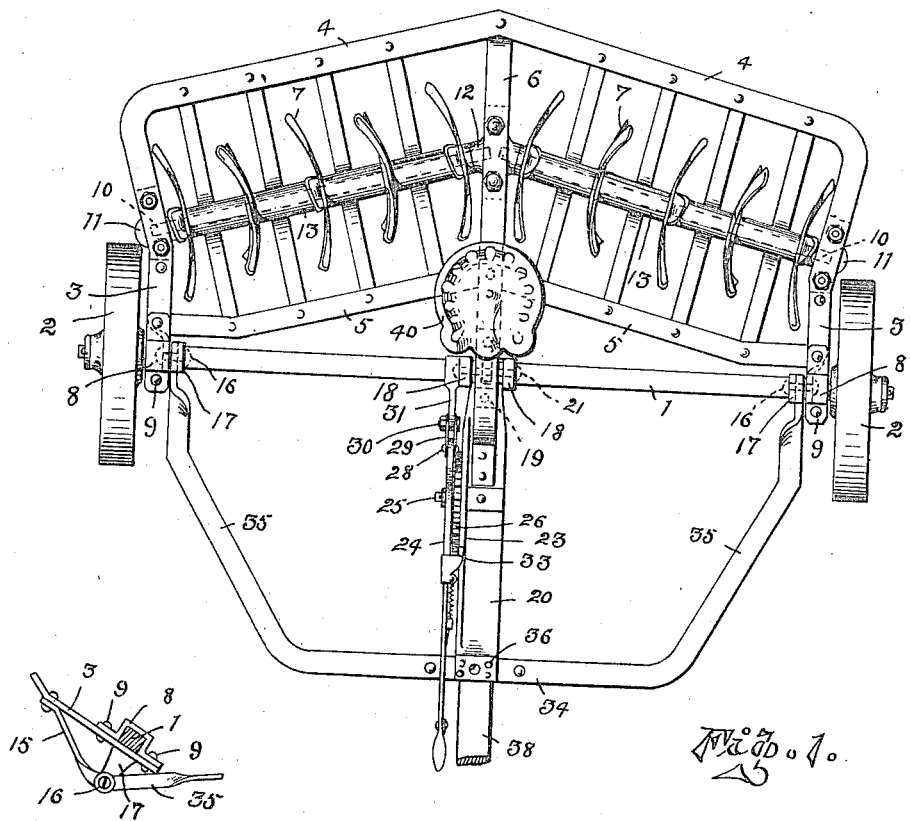
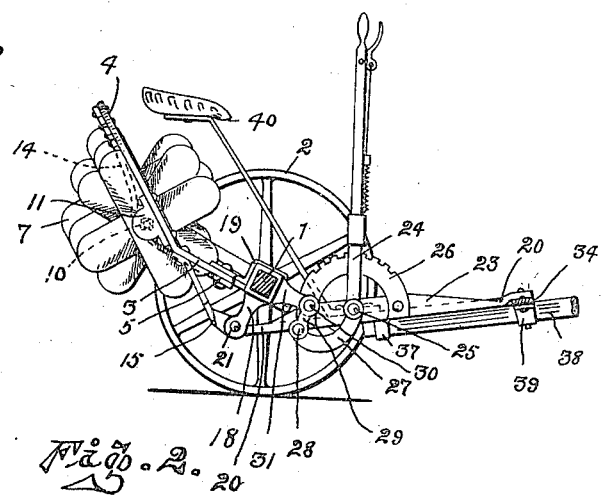
INVENTORS.
Matt Strom.
Eric Hoglund.
BY
Stro Stevens.
ATTORNEY.

UNITED STATES PATENT OFFICE.

MATT STROM AND ERIC HOGLUND, OF DULUTH, MINNESOTA.

SOIL-CULTIVATOR.

1,238,953. Specification of Letters Patent. Patented Sept. 4, 1917.

Application filed April 2, 1917. Serial No. 159,229.

*To all whom it may concern:*

Be it known that we, MATT STROM, a citizen of the United States, and ERIC HOGLUND, a citizen of Russia, both residing at Duluth, in the county of St. Louis and State of Minnesota, have invented certain new and useful Improvements in Soil-Cultivators, of which the following is a specification, reference being had therein to the accompanying drawing.

This invention consists of certain improvements in soil cultivating machines and relates particularly to horse drawn cultivators in which the soil engaging elements are revolved by contact with the soil in the act of performing their function.

The primary object is to produce practical and simple means for conveniently lowering and raising the soil cultivating elements to and from engagement with the soil, both for regulating the depth of cultivation and for transporting the machine when not in operative action.

Other objects and advantages of the novel combination of elements will appear in the further description of the device.

In the accompanying drawings forming part of this application and in which like reference characters indicate like parts:—

Figure 1 is a top plan view of the completely assembled machine as it would appear in action.

Fig. 2 is a side elevation of same except that the soil cultivating elements are illustrated as being raised and the near wheel and part of the frame are broken away for comprehensive illustration of the raising and lowering mechanism.

Fig. 3 is a side elevation of a fragmental portion of the frame where connected to the axle.

The device comprises a two wheeled vehicle having a single axle 1 square in cross section throughout except at the extreme ends where the wheels 2—2 are rotatably mounted thereupon.

A frame preferably made of flat bar iron comprising the sides 3—3, rear portions 4—4, front portions 5—5 and central member 6 is suspended from the axle and rotatably carries therein the soil cultivating elements, 7.

The sides 3—3 of the frame are attached to the axle adjacent the wheels 2 by straps 8 which overlap the axle and are securely attached by bolts or rivets 9 to the sides 3, there being one strap upon each side. The central member 6 is also attached to the axle 1 in a like manner by the strap 19.

The various portions of the frame are securely riveted together to form a rigid support for the cultivator-shafts 10—10 and which frame is preferably slightly V shaped with the apex thereof extending away from the axle 1. Each shaft 10, being parallel with the sides of the half of the frame in which it is mounted, fixes said shafts at an angle to the axle and which angle is that determined by practice to be the most practical for the desired results in cultivation.

The shafts 10—10 are square in cross section throughout except at their extreme ends where they are journaled in suitable outer boxes, 11—11, and the central double bearing box 12, which accommodates the inner ends of both the shafts, these boxes being rigidly fixed to the frame.

The cultivating blades 7 are slipped onto the shafts 10 in pairs when the latter are removed from the machine and are spaced apart by suitable hollow sleeve sections 13 slipped onto the shaft 10 between each pair of the cultivating blades. This method, however, of mounting cultivator blades is old and forms no part of my present invention.

Between each pair of cultivating elements 7 and passing beneath the sleeves between the elements, is fixed a bar 14, which may be either square or round, and fastened at one end to the rear 4 of the frame and at the opposite end to the front 5. These bars are for the purpose of strengthening the frame and acting as cleaning guards to the cultivating elements to prevent the latter carrying sods or other loose material about with them as they rotate.

The sides 3 of the shaft supporting frame are bent both vertically and laterally at a point opposite the peripheral edge of the wheels so that they flare outwardly beyond a plane with the inner side of the wheels and extend upwardly at an angle to that portion connected with the axle, which brings the rear portion of the frame substantially parallel with the surface of the ground when the cultivating elements are in service.

The central member 6 is also bent upwardly to coincide with the side members. Adjacent and just forward of the angle in each side and central member is fixed a downwardly inclined brace 15, the free ends of which upon the side members, are each attached as at 16 to the end of a depending arm 17. The upper ends of the arms 17 are enlarged and have a square hole therethrough which completely surrounds the axle 1 and are clearly seen on Fig. 1.

The brace 15 on the central member 6 is similarly connected intermediate depending arms 18—18 identical with the arms 17, except that there are two of them and spaced apart to permit of the strap 19 being established therebetween. This spreading of the arms 18—18 also permits of the pivotal attachment of the tongue supporting member 20 therebetween and upon the same pivotal pin which is designated at 21.

The end of the member 20, through which the pin 21 passes, is bifurcated to permit of the free end of the coöperating brace 15 to also surround the pin intermediate said bifurcated portion.

Thus the frame, which suports the cultivating elements, is securely non-rotatably fixed to the axle and braced upwardly at the sides and center from fixed arms depending from the axle.

The tongue supporting member 20, which also supports the driver's seat 40 and the lever controlling mechanism, is, as before stated, pivotally supported upon the pin 21 and one edge thereof as indicated at 23, is turned upwardly at right angles to the body portion to strengthen same and to form a suitable support for the lever 24, which is pivoted thereto at 25. This upturned portion 23 also supports the lever engaged quadrant 26.

The lever 24 has formed integral therewith the depending backwardly curved extension 27, the free end of which is pivotally attached at 28 to the link 29, the opposite end of which latter is pivotally attached at 30 to the free end of the arm 31.

The arm 31 is identical with the arms 17 and 18 and is mounted upon the axle in the same non-rotatable manner in respect to the axle, except that it is disposed at right angles thereto and extends forwardly instead of downwardly.

Notches 32 are formed in the peripheral edge of the quadrant 26 and into which any form of suitably controlled dog 33 may be made to engage for locking the lever in any predetermined position relative to the quadrant. By the lever 24 and its connections above described, the relative position of the cultivator supporting frame to the tongue supporting member, may be readily changed by the operator as is obvious.

A yoke, comprising the straight transverse portion 34 and two inclined inwardly bent side portions 35—35, is attached as at 36 to the forward end of the tongue supporting member 20 and the two free ends pivotally mounted upon the pins 16 carried by the arms 17, one upon each side of the machine, thus forming a substantial lateral brace for the member 20 and which is free to be raised and lowered with the member 20 in respect to the axle 1.

Depending from the member 20 and approximately midway of its ends, is a strap 37 to receive the end of the tongue 38, and another somewhat larger strap 39, for a like purpose, depending from the junction of the member 20 and the yoke.

A suitable seat 40 is yieldably supported from the member 20, as is customary in similarly constructed machines.

In operation, the tongue being supported by the horses hitched thereto, that portion of the machine directly attached to the tongue will remain substantially stationary, and the axle 1, together with the cultivator carrying frame fixed thereto, will have its pivotal bearing in the wheels 2—2, the connection with the tongue frame also being pivotal as before described.

When the lever 24 is drawn toward the operator in the seat 40, the arm 31 will be drawn downward, which action will rock the axle 1 in the wheel 2—2 and thus tip upwardly the frame with the cultivators therein as illustrated in Fig. 2. When the lever 24 is thrown forward, the cultivators will be brought in contact with the ground for action, and the depth of which in relation to the ground may be regulated by the lever 24.

It is evident that the machine may be made larger and a greater number of sets of cultivating elements used if desired. The cultivators proper may be as shown or either solid or cut away disks as preferred, and all of which are well known to the art.

It is to be understood that modifications, and other arrangements of parts within the scope of the invention, may be resorted to without departing from the spirit thereof.

Having thus described our invention what we claim as new and desire to secure by Letters Patent is:

1. A cultivator of the class described, comprising in combination a single two-wheeled axle, a cultivator carrying frame rigidly fixed to and extending rearwardly from said axle, the outermost portion of said frame being bent upwardly forming an obtuse angle therein, a plurality of depending arms fixed to the axle, a second frame extending forwardly of said axle and pivotally carried in the free ends of the arms, braces extending from the angle in the cultivator frame to the free ends of the arms, an arm centrally located upon the axle and extending forwardly at right angles to the first mentioned arms and an operating lever pivotally mounted upon the second frame and connected with the last mentioned arm whereby the cultivator frame is raised or lowered by the rocking of the axle.

2. The combination with a cultivator of the class described, having a cultivator carrying frame rigidly fixed to the vehicle axle, of a second tongue supporting frame pivotally suspended a fixed distance below the axle independently of the first mentioned frame and normally substantially parallel with the cultivator carrying frame and coöperating means carried by the second frame and the axle for changing the angular relation of the frames by rocking the axle.

In testimony whereof we hereunto affix our signatures in the presence of two witnesses.

MATT STROM.
ERIC HOGLUND.

Witnesses:
A. F. SWANSTROM, Jr.,
E. A. SWANSTROM.

Copies of this patent may be obtained for five cents each, by addressing the "Commissioner of Patents, Washington, D. C."